United States Patent [19]

Greig

[11] 3,834,815

[45] Sept. 10, 1974

[54] PHOTOCOPYING APPARATUS WITH VACUUM MEANS

[75] Inventor: Alfred L. Greig, Cupertino, Calif.

[73] Assignee: IPT Corporation, Sunnyvale, Calif.

[22] Filed: July 6, 1973

[21] Appl. No.: 367,852

[52] U.S. Cl. .................................................. 355/91

[51] Int. Cl. .......................................... G03b 27/20

[58] Field of Search ............. 355/87, 91, 92, 93, 94

[56] References Cited

UNITED STATES PATENTS

| | | | |
|---|---|---|---|
| 3,087,404 | 4/1963 | Hase | 355/94 |
| 3,455,634 | 7/1969 | Guffon | 355/91 |
| 3,604,800 | 9/1971 | Jordan | 355/91 |

*Primary Examiner*—John M. Horan

*Attorney, Agent, or Firm*—Limbach, Limbach & Sutton

[57] ABSTRACT

A device for duplicating a high resolution master transparency onto a photosensitive copy sheet wherein both are placed in a spaced apart relation within a vacuum chamber while the pressure within the chamber is reduced to a very low level significantly less than that of atmospheric pressure. The master transparency and the photocopy sheet are then mechanically urged together followed by a light exposure of the photocopy sheet through the master transparency. Air bubbles do not form between the master transparency and the photocopy sheet with the result of much better copies being made. The photocopy sheet and the master transparency are made ready for exposure in a very short period of time.

1 Claim, 5 Drawing Figures

PHOTOCOPYING APPARATUS WITH VACUUM MEANS

BACKGROUND OF THE INVENTION

This invention relates to photoprinting techniques and is an improvement over the technique of U.S. Pat. No. 3,687,546, issued Aug. 29, 1972 and assigned to the assignee of the present application. Such a system as disclosed in this earlier patent is manufactured as Photomask Duplicator PD-1200 by the assignee of the present application, IPT Corporation of Sunnyvale, Calif.

This existing photoduplicating apparatus holds a high resolution master transparency and a photosensitive copy plate in close contact by mechanical means during a light exposure through the transparency of the photocopy plate. A principal use of such apparatus is as a step in the manufacture of transistor and integrated circuits. The master transparency contains a pattern of opaque and transparent regions corresponding to a circuit to be formed. The photocopy plate is often a photoresist material.

It has been found that for the circuit patterns of increased density that are recorded on a master transparency in modern integrated circuit manufacturing processes that mechanical holding alone does not position the master transparency pattern close enough to a photosensitive copy layer in order to make a copy of the required high resolution. The pattern recorded on the master transparency diffracts the illuminating light enough so that even minute distances between the master transparency and the photosensitive layer result in a blurring and loss of resolution to the pattern that is exposed on the photocopy material.

One technique presently used to bring a master transparency closer to a photocopy material utilizes a vacuum frame in which the master transparency and the photocopy sheet are mechanically held close together. A vacuum is subsequently drawn between the master transparency and the photocopy sheet so that atmospheric pressure surrounding the combination forces the master transparency and the copy plates into very close contact. After exposure in this close contact configuration, the master transparency and photocopy sheet are manually separated.

The use of such a vacuum frame has the disadvantage of requiring a significant amount of manual operation and additionally requires that a vacuum be drawn for up to several minutes in order to adequately remove all air pockets between the master transparency and the photocopy sheet that tend to hold them apart and result in reduced resolution. Therefore, it is a primary object of the present invention to provide a technique and apparatus with all of the automatic features of that described in the aforesaid U.S. Pat. No. 3,687,546 and its corresponding commercial apparatus while improving the closeness of the contact between the master transparency and the photocopy sheet during exposure thereof.

SUMMARY OF THE INVENTION

Briefly, this and additional objects are accomplished by the present invention wherein the master transparency and the photosensitive copy medium are placed in a vacuum type chamber in a spaced apart relationship. A vacuum is then drawn until the pressure in the vacuum chamber is very low, something less than five inches of mercury being preferred. The master transparency and the photosensitive copy sheet are then mechanically urged together. Very close contact is obtained because of the substantial absence of air between the master transparency and the photosensitive copy sheet as they are urged together. Trapped air therebetween is substantially eliminated. Additionally, regions of the backside of the transparency and the copy sheet are permitted to return to normal atmospheric pressure, thus providing an additional force to hold the master transparency and photocopy sheet together. A high quality copy is thus obtained by a subsequent exposure through the master transparency.

Such an improved photoprinting apparatus is being manufactured and sold as Model PD-1500-VC by the assignee of the present application, IPT Corporation of Sunnyvale, California. This improved model with the vacuum feature is preferred over the standard model PD-1200 when the master transparency to be copied contains a pattern that is extremely dense and has very fine detail.

Additional features, objects, and advantages of the present invention will become apparent from the following detailed description of a preferred embodiment thereof which should be taken in conjunction with the accompanying drawings.

DESCRIPTION OF THE PREFERRED EMBODIMENTS

Figures 1, 2, 3:
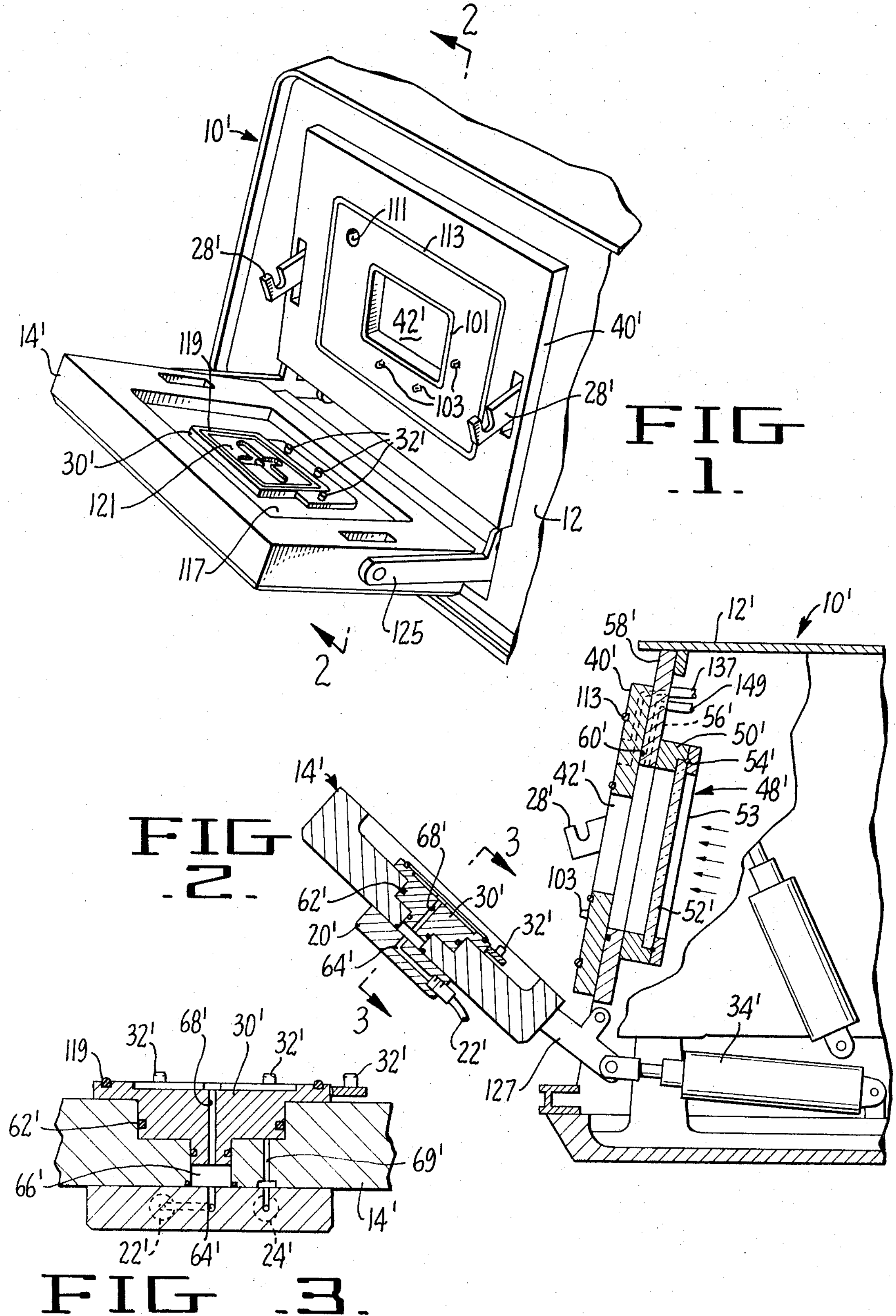
FIG. 1 is a perspective view of a preferred embodiment of the present invention with the apparatus shown in the loading or open position.
FIG. 2 is a cross-sectional view of the apparatus of FIG. 1 taken across section 2—2 thereof.
FIG. 3 is a sectional view taken across section 2—2 of FIG. 2.

It will be recognized that FIGS. 1–3 of the present application correspond to FIGS. 2, 3 and 4*a* of the aforementioned U.S. Pat. No. 3,687,546. Elements of the Figures herein that have like corresponding elements in the aforementioned patent are given the same reference characters with a prime (′) added. Additional details of these common elements may be had by reference to that patent. Only the detail necessary for an understanding of the improvement of this invention and its cooperation with the elements of the earlier apparatus are given herein.

Figures 4, 5:
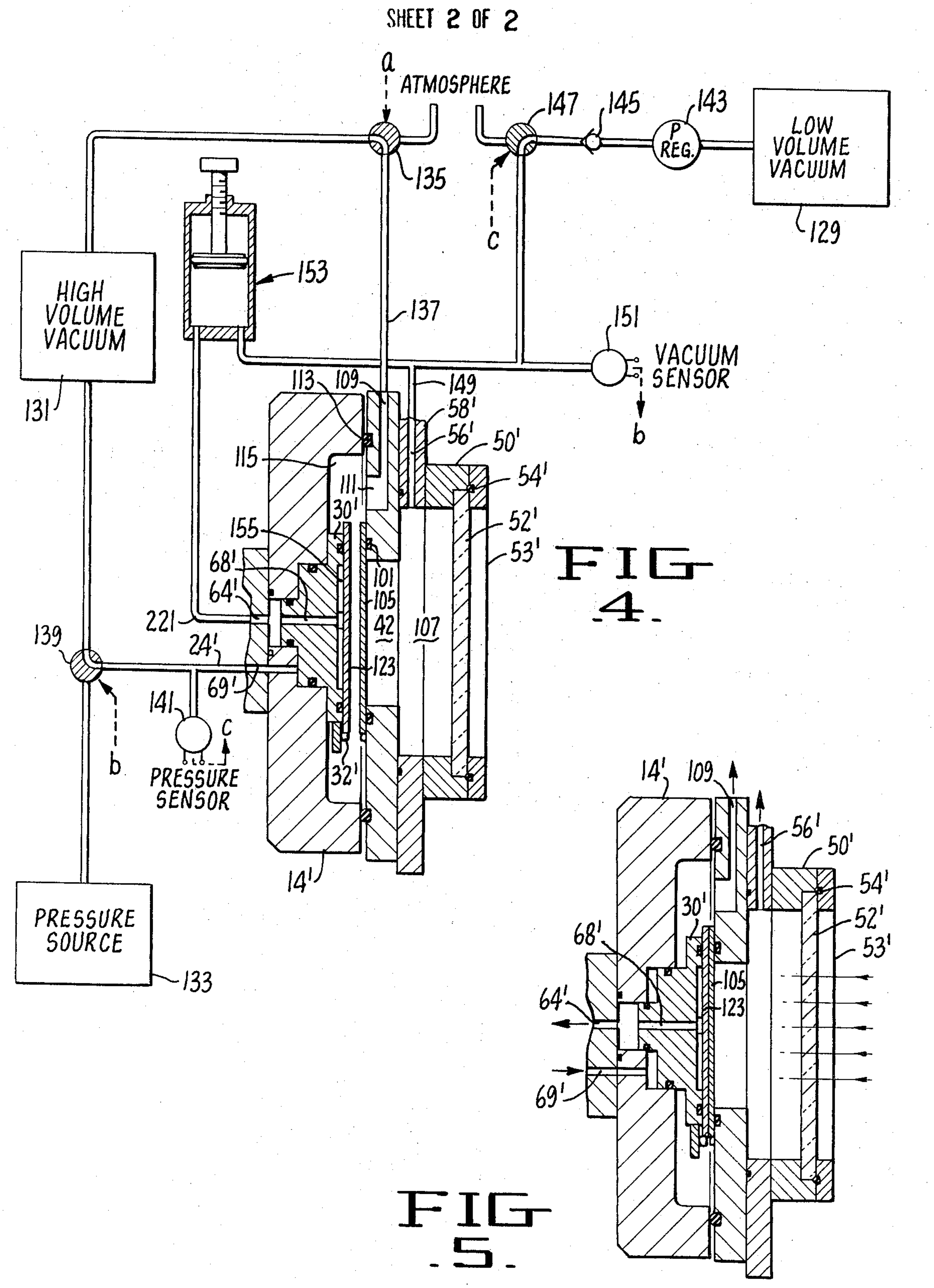
FIG. 4 shows the same view of the apparatus as in FIG. 2 but with the apparatus in its closed position and with certain vacuum and pressure components schematically illustrated.
FIG. 5 shows the same view of the apparatus as in FIG. 4 but with certain elements thereof in a different position.

The front of the photo apparatus 10′ is provided with a front plate pressure window 58′ having a window housing 50′ mounted behind an opening therein. A thick glass pressure window 52′ is mechanically held by the window housing 50′ and sealed thereto. An exposure takes place by passing light through the window 52′ in the direction of the arrow shown in FIG. 2 from a light source (not shown) within the photo apparatus 10′. A preferred mercury light source and lens system is illustrated in FIG. 5 in aforementioned U.S. Pat. No. 3,687,546.

A master plate holder 40' is detachably held onto the front plate pressure window 58' and includes an aperture 42' in its center with a size corresponding to the size of the master transparency to be copied. The aperture 42' is rectangular in shape with sides that are parallel to the sides of the photo apparatus 10'. An O-ring gasket 101 is provided on the front of the master plate holder 40' and surrounds the aperture 42'. A plurality of supporting pins 103 are provided adjacent the aperture 42' in order to hold a master transparency against gravity and also to register it properly over the aperture 42'. The arrangement of the aperture 42', the O-ring seal 101 and the support pins 103 all cooperate to hold a master transparency to cover the seal 101 so that a vacuum may be drawn through a duct 56' without substantial air leaks around a master transparency. The master transparencies contemplated for use with this apparatus are generally of stiff material such as glass. A master transparency 105 is shown in FIG. 4 to be tightly held against the O-ring 101, thereby forming a master transparency vacuum chamber 107 which is controlled as to pressure through the duct 56' as explained hereinafter.

A duct 109 is provided within the master plate holder 40' and communicates with an aperture 111 in the front of the master plate holder 40'. An O-ring gasket 113 in a rectilinear shape is held on the face of the master plate holder 40'. An inner surface of a copy handling chamber door 14' is sealed to this O-ring 113 when the door 14' is closed, as shown in FIGS. 4 and 5, and latched by the door clamps 28'. When the door is closed, as shown in FIGS. 4 and 5, a vacuum chamber 115 is formed with the pressure therein controlled through the aperture 111.

The door 14' has a recessed portion 117 in which a piston-like copy plate holder 30' is positioned. Pins 32' are provided for support and registration of a photosensitive copy plate. The pins 32' are cooperatively arranged with the pins 103 so that a master transparency and a photosensitive copy plate are properly registered. An O-ring sealing gasket 119 is provided around the edge of copy plate holder 30' for contacting and supporting a copy plate positioned thereon. As shown most clearly in FIG. 3, the copy plate 30' is a piston member sealed to and movable with respect to the door 14'. A vacuum duct 68' communicates with the face of the copy holder 30'. A vacuum is applied to the duct 68' through a chamber 66', the vacuum ducts 64' and a vacuum line 22'. Slight recessed areas 121, such as a cross shape as shown in FIG. 1, are provided on the front face of the copy holder 30' in communication with the duct 68' so that the vacuum therein lowers the pressure over a wide area behind a copy plate held thereon.

To provide motive power to the piston copy holder 30', a pressure duct 69' communicates with a pressure line 24'. A high pressure source will move the piston member 30' outward a distance from that shown in FIG. 3 while a vacuum source applied to the duct 69' will draw the piston 30' back into the door 14' to the position shown in FIG. 3.

Referring to FIGS. 4 and 5, a copy plate 123 is positioned on the face of the copy plate holder 30'. The copy plate 123 generally consists of a relatively rigid glass substrate with a photosensitive coating thereon. FIG. 5 shows the piston 30' being pushed out of the door 14' to mechanically urge the the copy plate 123 against the master transparency 105. Of course, the master transparency 105 is positioned so that the pattern to be copied is on its side which faces the copy plate 123. Similarly, the photosensitive layer of the copy plate 123 faces the master plate 105. The closest contact possible between the photosensitive layer and the master transparency pattern to be copied is desired.

The door 14' is held by a pair of gimbal arms 125 and 127 (FIGS. 1 and 2). The door 14' is pinned near its middle to the gimbal arms 125 and 127 which extend along either side thereof. The door 14' is made to be slightly rotatable with respect to the gimbal arms 125 and 127 in order to provide for proper seating and registration of the door 14'. The gimbal arms 125 and 127 are attached at their opposite ends to a hinge structure which pivots with respect to the front plate pressure window 58'.

Referring to FIG. 4, a schematic diagram of the pressure and vacuum system which operates the improvements of the present invention will now be described. Connections are provided on the back of the housing 12' (not shown) of the instrument for connection with external vacuum sources 129 and 131 as well as a connection for attachment of a pressure source 133. The vacuum source 131 must be capable of drawing a high volume and is connected through a valve 135 and a vacuum line 137 to the duct 109. When the valve 135 is the position shown in FIG. 4, the vacuum source 131 evacuates the vacuum chamber 115. When the valve 135 is moved to its second position, the vacuum chamber 115 receives the atmospheric pressure directly.

The vacuum source 131 is also connected through a valve 139 to the pressure line 24'. When the valve is in the position shown in FIG. 4, the piston 30' is drawn back into the door 14'. When the valve 139 is switched to its second position, the pressure source 133 communicates with the pressure line 24' and tends to force the piston 30' outward in a manner shown in FIG. 5. A pressure sensor 141 is connected to the pressure line 24' and emits an electrical signal when the pressure therein exceeds a certain predetermined level.

The vacuum source 129 is connected through a pressure regulator 143 and a check valve 145 and through a two-position control valve 147 to a vacuum line 149. The vacuum line 149 communicates with the ducts 56'. A vacuum sensor 151 is also connected to the line 149 and emits an electrical signal when the pressure therein drops below a certain predetermined level. Additionally, the output of the valve 147 communicates through a variable volume chamber 153 to the vacuum line 22'. Thus, when the valve 147 is in the position shown, vacuums are drawn in the master transparency compartment 107 and in a compartment 155 behind the copy plate 123. The pressure regulator 143 is set, in a preferred embodiment, to draw a vacuum in these compartments of from 8 to 10 inches of mercury. So long as the pressure in the vacuum chamber 115 is higher than that in the compartments 107 and 155, these compartments remain sealed off from the vacuum chamber 115 by the master transparency 105 and the copy plate 123, respectively.

The valves 135, 139 and 147 have two fluid positions and are preferably electrically controlled but they may also be manually controlled. Electrical control allows the machine to have an automatic sequence, as described hereinafter, which minimizes the time and human effort necessary in making photocopies with the apparatus being described. The vacuum source 131 is preferably capable of drawing a vacuum of about 27 inches of mercury. It is desired to draw the pressure within the vacuum chamber 115 to about 4 inches of mercury absolute pressure or less.

The operation of the apparatus will now be described. The door is opened in a manner shown in FIGS. 1 and 2 so that the master transparency 105 and the copy plate 123 may be placed in their respective positions. The valve 147 of FIG. 4 is then switched from connection with atmosphere to the position shown so that a vacuum is applied to the copy plate chamber 155 in the master transparency chamber 107. The valve 135 is connected to atmosphere so that this vacuum of 8–10 inches of mercury holds the master transparency 105 and the copy plate 123 tightly against their respective supporting structures.

The door 14' is then closed and tightly latched to form the vacuum chamber 115 which includes the space between the master transparency 105 and the copy plate 123. This closing actuates a switch (not shown) which energizes the valve 135 at "*a*" and moves it to the position shown in FIG. 4 which communicates the vacuum chamber 115 to the vacuum source 131. The pressure within the chamber 115 is then reduced. As it goes below the level of the pressure within the compartments 107 and 155, there is some air leakage from these compartments around the seals of the master transparency 105 and the copy plate 123 into the vacuum chamber 115. As the pressure is reduced further by the operation of the vacuum pump 131, the pressure in the vacuum chamber 115 and the compartments 107 and 155 eventually all becomes the same, that pressure to which the vacuum pump 131 is capable of reducing them. At a certain preset pressure approximately one-half or one inch of mercury in excess of the ultimate vacuum capable of being drawn in the chamber 115, a signal is emitted by the vacuum sensor 115 which is communicated with the electro-magnetically operated valve 139. The valve 139 is normally held in the position shown, but a signal from the vacuum sensor 151 is applied at "*b*" of the valve 139 to switch it for connection of the pressure line 24' to the pressure source 133. This then, in automatic sequence, drives the piston 30' forward into a position shown in FIG. 5. The master transparency 105 and the copy plate 123 have been mechanically forced together with very little air between them so that the possibility of air pockets existing is substantially eliminated.

A pressure sensitive switch 141 detects a pressure rise in the pressure line 24' which occurs after the piston 30' has been moved forward to bring the master transparency 105 and the copy plate 123 into close contact with each other. An electrical signal from the pressure sensor 141, illustrated at "*c*", switches the valve 147 from the position shown in FIG. 4 so that the compartments 107 and 155 communicate with the atmosphere. The pressure in these compartments increases rapidly and serves to additionally urge the master transparency 105 and the copy plate 155 against each other. The master transparency is thus illuminated as indicated in FIG. 5 and the copy plate 123 exposed. The vacuum remains in the chamber 115 during this exposure.

After an exposure for a required period of time for the particular photosensitive medium on the copy plate 123, the valve 135 is operated to communicate the vacuum chamber 115 with atmospheric pressure. The valve 147 is then again operated to draw a partial vacuum in the chambers 107 and 155 in order to hold the master transparency 105 and the exposed copy plate 123 against their respective support mechanisms. When the holding vacuums are drawn, the piston 30' is withdrawn by throwing the valve into the position illustrated in FIG. 4. This separates the copy and master plates. The door 14' may then be opened for removal of the exposed copy plate 123.

The variable volume chamber 153 serves a purpose of helping to balance the pressure forces during backfill of the chambers 107 and 155. It will be noted that the volume of the compartment 155 behind the copy plate 123 is substantially smaller than the volume of master transparency chamber 107. When the valve 147 switches these chambers from communication with the vacuum pump 129 to the atmosphere, pressure will increase much faster in the compartment 155 behind the copy plate 123 than in the master transparency compartment 107 if the added volume 153 is not provided. The result without the volume 153 is that the transparency and copy plate bow inward slightly into the aperture 42. Even when the pressures are subsequently equalized in the chamber 107 and 155 at atmospheric pressure, forces between the transparency and the copy plate hold it in such a curved position. If the transparency is copied in this state, the copy would be distorted.

Therefore, the increasing forces during the increasing pressure in the chamber 155 and 107 are maintained as balanced as possible to prevent this warping. The volume to be filled is an important factor, but also the resistance of the pneumatic paths also affect these forces. The chamber 153 dynamically balances the volumes on either side of the master transparency and copy plate when held together so that the forces produced by increasing backfill air pressure are equal.

The volume 153 is made to be variable so that a given photocopy machine 10' may accommodate a master plate holder 40' and copy plate holder 30' of different sizes for various size transparencies and copies to be made. The master plate holder 40' is made to be easily removable from the front of the machine and the door 14' is also easily removable. This permits replacement with other like components that have a different sized aperture 42' and correspondingly different sized copy plate holder 30'. When these are changed, of course, the volumes of the master transparency compartment 107 and the copy plate compartment 155 are different. The variable volume 153 is then set for the new copying apparatus in order to aid in balancing the forces created by inrushing air as the vacuum is released and the chambers 107 and 155 are switched to atmospheric pressure.

A specific example of a device incorporating the various aspects of the present invention has been described, but it will be understood that the invention in entitled to protection within the full scope of the appended claims.

I claim:

1. Apparatus for making a photocopy of a master transparency, comprising:

a vacuum chamber formed of first and second cooperating wall assemblies that are separable to permit access into said chamber, said first wall assembly including a light transparent window therein, means within the vacuum chamber on said first wall assembly for holding a master transparency in a manner to form a compartment therebehind but in front of said window that is sealed from the rest of said vacuum chamber at least when the pressure in said master compartment is less than that on the opposite side of said master transparency, means within the vacuum chamber on said second wall assembly for holding a photocopy sheet in a manner forming a compartment therebehind that is vacuum sealed from the rest of said vacuum chamber at least when the pressure in said photocopy compartment is less than that on the opposite side of said photocopy sheet, the volume of said photocopy compartment being much less than the volume of said master chamber, said photocopy holding means being slidable in said second wall assembly to a first extreme position to urge the master and photocopy against each other when said first and second walls are connected together to form said vacuum chamber, said photocopy holding means also being movable to a second extreme position providing a space between said master and photocopy, means including a pneumatic system for moving said photocopy holding means back and forth between its said extreme positions, a first vacuum line communicating through said second wall assembly into said photocopy compartment, a second vacuum line communicating through said first wall assembly into the master compartment, said second vacuum line joining said first vacuum line to form a common line, a compensating chamber positioned in said first vacuum line and having a volume sufficient to make about the same the total volumes of each of said vacuum lines including their respective compartments, a vacuum source, a vacuum valve operably connected to said common vacuum line in a manner to selectively connect said common line to said vacuum source or to vent said common line to the atmosphere, means responsive to pressure in said common vacuum line falling to a predetermined level far below normal atmospheric pressure for automatically causing said pneumatic system to move said photocopy holder to its said first extreme position wherein said master and photocopy are mechanically urged against said one another, and means sensing the movement of said photocopy holding means to its said first extreme position for automatically switching said vacuum valve to open the common vacuum line to the atmosphere, whereby the master transparency and the photocopy sheet are automatically positioned for exposure once an operator has initiated connection of the common line to the vacuum pump by operation of said vacuum valve.

* * * * *